C. KELTNER.
MILK PAIL STRAINER.
APPLICATION FILED JULY 25, 1912.
1,055,541. Patented Mar. 11, 1913.
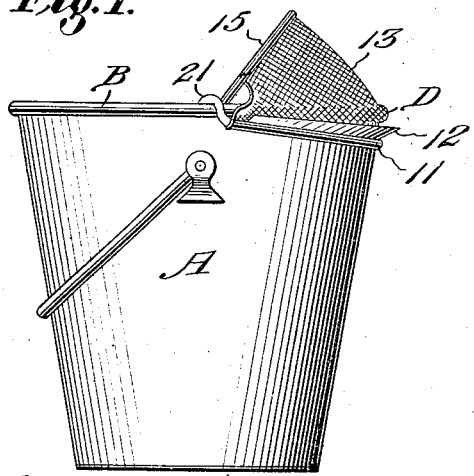
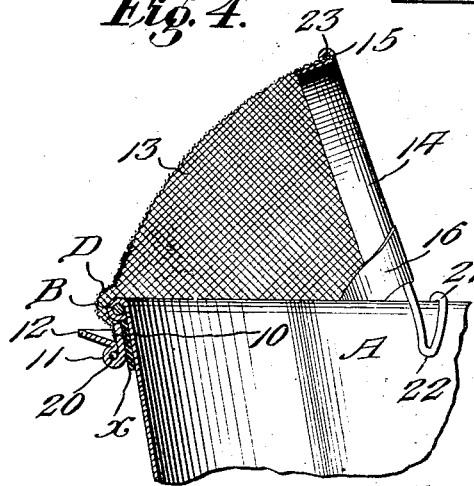
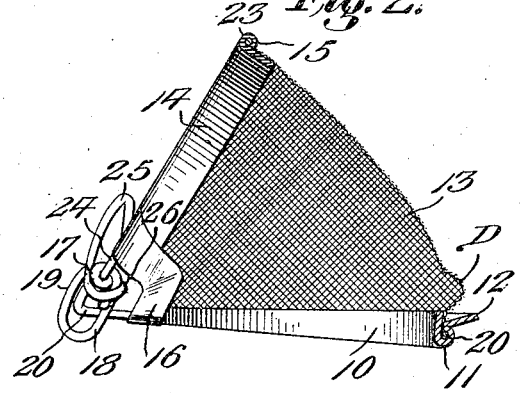
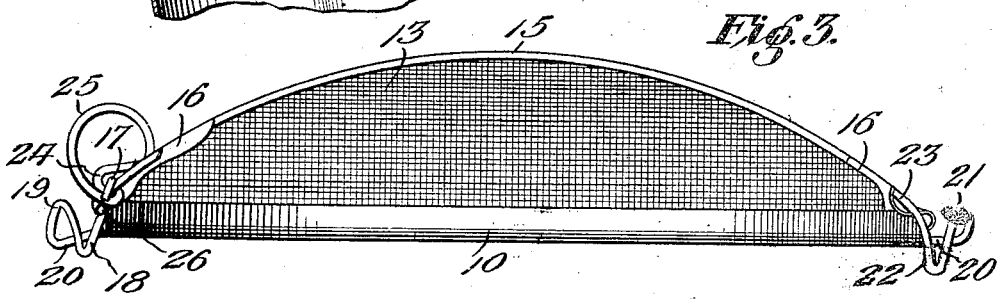
Witnesses
Edwin G. McKee
Louise G. Reilly
Inventor
Claud Keltner
By George W. Sues
Attorney

UNITED STATES PATENT OFFICE.

CLAUD KELTNER, OF COVINGTON, OKLAHOMA.

MILK-PAIL STRAINER.

1,055,541.  Specification of Letters Patent.  Patented Mar. 11, 1913.

Application filed July 25, 1912. Serial No. 711,548.

*To all whom it may concern:*

Be it known that I, CLAUD KELTNER, a citizen of the United States, and a resident of Covington, in the county of Garfield and State of Oklahoma, have invented certain new and useful Improvements in Milk-Pail Strainers, of which the following is a specification, reference being had to the accompanying drawings.

This invention relates to certain new and useful improvements in milk pail strainers arranged to be attached to milk pails; and the primary object of my invention is to provide a milk pail strainer, which can be easily kept in a sanitary condition, and is arranged to be sprung upon the edge of a milk pail in a manner permitting the ready removal of the same.

Another object is to provide a milk pail with a readily attachable strainer, of a simple and inexpensive nature and of a durable construction, which shall be capable of convenient and accurate adjustment upon the edge of the pail, so that the milk poured out of the pail will be strained and freed from any impurities.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, shows a side elevational view of milk pail provided with a strainer constructed according to my invention. Fig. 2, is a transverse sectional view through the strainer. Fig. 3, is a rear elevational view of the strainer. Fig. 4, is a transverse sectional view through the strainer showing the same as attached to a fragmentary portion of a milk pail.

In my present invention I provide a simply constructed milk strainer of a predetermined size, arranged to be clamped upon a tin pail having a certain upper edge or throat diameter.

In the drawings, the letter A, designates an ordinary pail of conventional construction with the usual edge bead B. The strainer comprises a bowed sheet metal band 10, which is slightly attenuated toward the ends as shown in Fig. 2. This band is recurved to form a middle lengthwise running open seam tube 11, from which the band is continued in an obliquely extending flange 12. Secured to this band 10, is a wire fabric 13, which has one of its edges secured to the outer face of the band 10, and preferably being held within the open seam of the tube 11, as clearly shown in Fig. 2. Secured to the opposite edge of this fabric 13, is the sheet metal strip 14, which is bowed and held transversely to the bowed member 10. This strip 14 has one edge recurved to form the bead 15, this bead also being in the form of an open seam tube. Secured to the ends of the strip 14, are the rectangular end members 16, which may form an integral part of the strip 14, or be soldered or otherwise secured thereto. These members 16 are also secured to the band 10.

In connection with the sheet metal members and the wire fabric, I use a wire frame made of spring wire, comprising the terminal eye 17, from which the wire is contained in a crooked stub stem 18, continued in a transversely extending U-shaped clamping ear 19, from which the wire is continued in the bowed portion 20, which is carried through the tubular member 11. At its end this bowed member 20 is provided with the counterpart U-shaped clamping ear 21, continued in the crooked stem 22, from which the wire 23, passes through the bead 15. At the end projecting through the bead 15, as shown in Fig. 3, the wire is recurved as shown at 24 and formed into the handle loop 25, the end 26 of which is coiled about the stem 18, below the eye 17. The wire fabric 13, at a point above the band 10 is bowed outward as is shown at D, so as to form an access space to receive the upper edge B of the pail A.

A strainer constructed according to my invention can be easily sprung upon a pail of a certain size.

Now in order to guard against any seepage of the milk between the member 10 and the pail A, I provide a rubber strip *x* though this is not absolutely necessary.

It is of course understood, that the strainers are made for a specific size of pail, so that the strainer can be quickly sprung upon the outer edge of the pail.

The strainer is simple and inexpensive in construction and both durable and efficient in operation and can be instantly secured or removed from the pail.

Having thus described my said invention what I claim as new and desire to secure by United States Letters Patent is:

1. A milk strainer including a bow shaped sheet metal band recurved to form a lengthwise running tube, from which the band is continued in an obliquely extending flange, a wire fabric having one edge secured to said band, a sheet metal strip 14, bowed transversely to said band having one edge recurved to form a bead, the ends being obliquely continued and secured to said band, and a spring wire member beginning with an eye from which the wire is continued in a crooked stub stem continued in a transversely extending U-shaped clamping ear from which the wire is bent transversely and continued through said tube at the end of which the wire is bent into a counterpart U-shaped clamping ear continued in the crooked stem from which the wire continued through said bead at the end of which the wire passes through said eye and ends in a handle loop having its termination bent about said stem below said eye.

2. A milk strainer including a bow shaped sheet metal band recurved to form a lengthwise running tube, from which is continued in an obliquely extending flange, a wire fabric having one edge secured to said band, a sheet metal bead the end being obliquely continued and secured to said band, a spring wire member beginning with an eye from which the wire is continued in a crooked stub stem continued in a transversely extending U-shaped clamping ear from which the wire is bent transversely and continued through said tube at the end of which the wire is bent into a counterpart U-shaped clamping ear continued in the crooked stem from which the wire continues through said bead at the end of which the wire passes through said eye and ends in a handle loop having its termination bent about said stem below said eye, said fabric being bowed outward at a point from said band, and an elastic strip secured to the inner face of said band.

In testimony whereof I affix my signature, in presence of two witnesses.

CLAUD KELTNER.

Witnesses:
C. H. TERWILLEGER,
L. D. JENKINS.